United States Patent [19]

Kavaliunas

[11] Patent Number: 5,035,809

[45] Date of Patent: Jul. 30, 1991

[54] DICHLOROMETHANE ABATEMENT

[75] Inventor: Arunas V. Kavaliunas, Rochester, N.Y.

[73] Assignee: Eastman Kodak Company, Rochester, N.Y.

[21] Appl. No.: 593,845

[22] Filed: Oct. 5, 1990

[51] Int. Cl.$^5$ ............................................. B01D 21/01
[52] U.S. Cl. .................................. 210/728; 210/729; 210/908
[58] Field of Search ............... 210/702, 729, 751, 749, 210/908, 728

[56] References Cited

U.S. PATENT DOCUMENTS 4,470,909 9/1984 Bright ................................. 210/634

Primary Examiner—Peter Hruskoci
Assistant Examiner—Krisanne Shideler
Attorney, Agent, or Firm—Robert A. Gerlach

[57] ABSTRACT

A method of treating dichloromethane laden streams to prevent discharge into the environment by contacting the laden stream with an aqueous solution of an alkali metal hydroxide and an alkylene ether glycol.

7 Claims, No Drawings

DICHLOROMETHANE ABATEMENT

BACKGROUND OF THE INVENTION

1. Field of the Invention

This invention relates to a method of effectively removing dichloromethane from effluent streams of a chemical process and thus to prevent the dichloromethane from entering the environment and more particularly to a method of converting the dichloromethane into a material that is more readily handled by disposal technique.

Dichloromethane is one of the more common laboratory and industrial solvents particularly useful because of its cost, non-flammability and low boiling point. Major users of dichloromethane recycle it, however, inevitably, some of it is lost to the environment.

2. Description of Related Art

The Williamson ether synthesis involves a reaction between a halide and an alkoxide, generally generated from the alcohol with sodium, potassium or other reactive metal. Sodium and potassium hydroxide are generally too weak to significantly deprotonate the alcohol.

SUMMARY OF THE INVENTION

The invention provides a method of treating dichloromethane laden effluent streams to effectively prevent its discharge to the environment by contacting the dichloromethane laden stream with an aqueous solution of an alkali metal hydroxide and an alkylene ether glycol.

DESCRIPTION OF THE PREFERRED EMBODIMENTS

The invention contemplates the destruction of dichloromethane by reaction with an alkali metal glycolate wherein the glycolate is formed by mixing a concentrated aqueous solution of an alkali metal hydroxide with an alkylene ether glycol, the alkylene ether glycol having a molecular weight of from 106 - to about 600 subjecting a stream of dichloromethane to this reaction product to form the alkali metal chloride salt and a solid reaction product and separating the salt and the solid organic reaction product which may be discarded in accordance with suitable environmental techniques or employed as an intermediate in the preparation of useful products. The advantage of this process is that the alkali metal salt is harmless and the reaction product is composed only of carbon, hydrogen and oxygen which is readily disposed of by standard technique such as burning.

In the practice of this invention, the dichloromethane laden stream may be contacted with glycolate by any suitable technique, which may be a batch type system, such as, a suitable reactor or a continuous type system, such as, for example, conventional scrubbers used in the chemical industry, fluidized beds, both stationary beds and rotating beds; countercurrent injection of the two materials into each other and the like. Intimate contact with the dichloromethane is preferred and system wherein residence time can be controlled is preferred.

Any suitable alkali metal hydroxide may be employed such as, sodium hydroxide, potassium hydroxide, lithium hydroxide, and the like. Sodium hydroxide and potassium hydroxides are preferred and potassium hydroxide is most preferred as the potassium glycolates are less viscous.

Any suitable alkylene ether glycol may be used to prepare the glycolate such as diethylene glycol, triethylene glycol, tetraethylene glycol, polyethylene glycol having a molecular weight of from about 195 to about 600, mixtures of such glycols, dipropylene glycol, tripropylene glycol, tetrapropylene glycol, polypropylene glycols having molecular weight up to about 600, polytetramethylene ether glycols having molecular weights up to about 600 and mixtures of the above. Preferred glycols are tetraethylene glycol and polyethylene glycols having a molecular weight up to 600.

The thus formed glycolate is employed directly in the treatment of a dichloromethane laden stream to react with the dichloromethane and thus prevent its discharge into the environment. As indicated above various types of apparatus may be employed to accomplish this objective. In one suitable batch method, the dichloromethane laden stream is introduced into a stirred reactor equipped with a reflux condenser. The reactor contains an amount of glycolate in excess of the amount of dichloromethane present in the stream.

Depending upon the glycolate employed, it may be necessary to heat the reactor. This is generally the case when diethylene glycolates and triethylene glycolates are employed. With the higher molecular weight glycolates including tetraethylene glycolates reflux occurs without heat. Reflux is continued for a period of time, generally 10 minutes to 1 hour. The precipitate formed is recovered by filtration or other suitable means and disposed of by standard environmentally sound techniques, known in the art.

The following general procedure was employed in the preparation of alkali metal glycolate and its reaction with dichloromethane:

A warm solution of about two equivalents of alkali metal hydroxide in about 30 ml of water was added to one equivalent of alkylene ether glycol in a two neck round bottom flask equipped with a reflux condenser and a magnetic stirring bar. Immediately a yellow color appeared in the solution which became warm. The temperature was taken to 85° C. and maintained for 20 minutes at which time the mixture became brown. The mixture was allowed to cool to 60° C. About 40 ml of dichloromethane was slowly introduced through the condenser. The mixture began to reflux at about 60°–65° C. for about 30 minutes without external heating. In the examples employing di-and triethylene glycolates heating was needed to continue reflux. A solid appeared in solution. After cooling the solid was filtered from the solution. The yield reported in the table is based on the quantity of salt recovered.

The reaction between a series of polyethylene glycols and an aqueous solution containing two equivalents of KOH or NaOH is mildly exothermic and results in a clear, somewhat viscous, brown solution. This solution reacts with dichloromethane to yield the alkali metal chloride and a mixture of organic products. These reactions were conducted with stoichiometric amounts of the glycols and alkali metal hydroxide and with a slight excess of dichloromethane. The yields of these reactions, based on isolated NaCl or KCl are given in Table 1. Since some of the salt is likely to be dissolved in the reaction mixture, the actual yields probably are somewhat higher.

TABLE 1

| Example No. | Glycol | Base[1] | Yield |
|---|---|---|---|
| 1 | ethylene glycol | KOH | 33% |

TABLE 1-continued

| Example No. | Glycol | Base[1] | Yield |
|---|---|---|---|
| 2 | diethylene glycol | KOH | 60% |
| 3 | triethylene glycol | KOH | 79% |
| 4 | tetraethylene glycol | KOH | 78% |
| 5 | polyethylene glycol 400 | KOH | 57% |
| 6 | polyethylene glycol 600 | KOH | 75% |
| 7(Comparison) | 1,5-pentanediol | KOH | 2.3% |
| 8 | triethylene glycol | NaOH | 21% |
| 9 | tetraethylene glycol | NaOH | 56% |

[1]Two equivalents of base used per equivalent of glycol, except with ethylene glycol, one equivalent was used.

Glycolates can be obtained by dissolving solid KOH or NaOH in the glycol, however, this procedure is very slow and offers no advantages. Addition of a concentrated aqueous solution of KOH or NaOH to a glycol is superior. The reaction is quite exothermic and results in a solution which quickly turns brown. With some glycols if this brown solution is allowed to cool it will solidify.

In these systems, KOH appears to be somewhat superior to NaOH and is therefore preferred. The potassium glycolates are less viscous than the sodium compounds and with all examined glycols, except for ethylene glycol, the reactions proceed better than 50% of completion.

The reactivity of the glycolates with dichloromethane appears to be dependent on the molecular weight of the glycol, with the higher molecular weight glycolates reacting faster. The potassium glycolates obtained from diethylene and triethylene glycols required outside heat to maintain reflux after addition of $CH_2Cl_2$, whereas the higher molecular weight glycolates maintained reflux without external heating.

A comparision was carried out using 1,5-pentanediol and aqueous KOH to which was added dichloromethane and the mixture maintained at reflux for about one hour. Work up of this mixture gave KCl in 2.3% yield.

A similar reaction with diethylene glycol resulted in a 60% yield of KCl, suggesting that the ether oxygens in the glycols may play a part in the reactivity of these glycols.

Dichloromethane upon reacting with glycolates may form cyclic ethers by ring closure through the —$CH_2$— group or it may react with two glycolate molecules and generate a higher molecular weight glycolate. In the latter reaction, it is capable of further reaction with dichloromethane. At this time it can close the ring or generate a higher molecular weight glycolate.

The reaction mixture of several preparations were examined by gas chromatography-mass spectroscopy and the presence of the cyclic ether was observed.

What is claimed is:

1. A method of removing dichloromethane from an effluent stream of a chemical process comprising contacting the stream containing dichloromethane with an aqueous solution of an alkali metal alkylene ether glycolate to form an alkali metal chloride salt and solid reaction product, and separating the salt and reaction product from said effluent stream.

2. The method of claim 1 wherein the alkali metal alkylene ether glycolate is formed in situ by reacting on alkylene ether glycol with an alkali metal hydroxide.

3. The method of claim 2 wherein the alkali metal hydroxide is sodium hydroxide or potassium hydroxide.

4. The method of claim 2 wherein the alkylene portion of the alkylene ether glycol has from 2 to 4 carbon atoms.

5. The method of claim 2 wherein the alkylene ether glycol is an ethylene ether glycol.

6. The method of claim 5 wherein the ethylene ether glycol has a molecular weight of from about 106 to about 600.

7. The method of claim 6 wherein the molecular weight is from about 195 to about 600.

* * * * *